United States Patent [19]

Zingher

[11] 4,191,457

[45] Mar. 4, 1980

[54] BI-DIRECTIONAL OPTICAL APPARATUS FOR ALTERING AN OPTICALLY PROJECTED MEMBER

[76] Inventor: Arthur R. Zingher, 511 Church Ave., Woodmere, N.Y. 11598

[21] Appl. No.: 935,709

[22] Filed: Aug. 21, 1978

[51] Int. Cl.[2] .............................................. G03B 21/00
[52] U.S. Cl. ........................................ 353/44; 353/35; 346/17; 346/76 L; 350/353; 430/1
[58] Field of Search ................... 355/45, 67; 96/27 H; 350/353, 354; 346/17, 76 L; 353/44, 42, 121, 122, 30, 35; 364/900

[56] References Cited

U.S. PATENT DOCUMENTS

| 3,282,183 | 11/1966 | Tuttle et al. ........................... 355/45 |
| 3,656,175 | 4/1972 | Carlson et al. ..................... 346/76 L |
| 3,775,005 | 11/1973 | Szubo ................................... 353/42 |
| 3,831,165 | 8/1974 | Chivian et al. ...................... 350/353 |
| 3,892,965 | 7/1975 | Blattner et al. ...................... 250/316 |
| 3,959,799 | 5/1976 | Gambino et al. ................... 346/76 L |
| 3,971,874 | 7/1976 | Ohta et al. ......................... 346/76 L |
| 4,000,945 | 1/1977 | Tajima et al. .......................... 355/45 |
| 4,118,229 | 10/1978 | Stromberger et al. .............. 96/27 H |
| 4,121,196 | 10/1978 | Johnson et al. ........................ 353/35 |

*Primary Examiner*—John W. Shepperd

[57] ABSTRACT

An apparatus for altering an optically projected member includes a writing light which is directed at the apparent projected image of the member, which may be a transparency or workpiece or the like. The writing light is transmitted backwards through the projection optics, and is focussed to an intensely illuminated writing spot near the projection member. A recording member, such as a recording transparency which is sensitive to the writing light and insensitive to the projection beam, is disposed adjacent to the projection slide. The recording member is altered by the focussed writing light to form a locally marked area which becomes incorporated in the apparent projected image.

20 Claims, 8 Drawing Figures

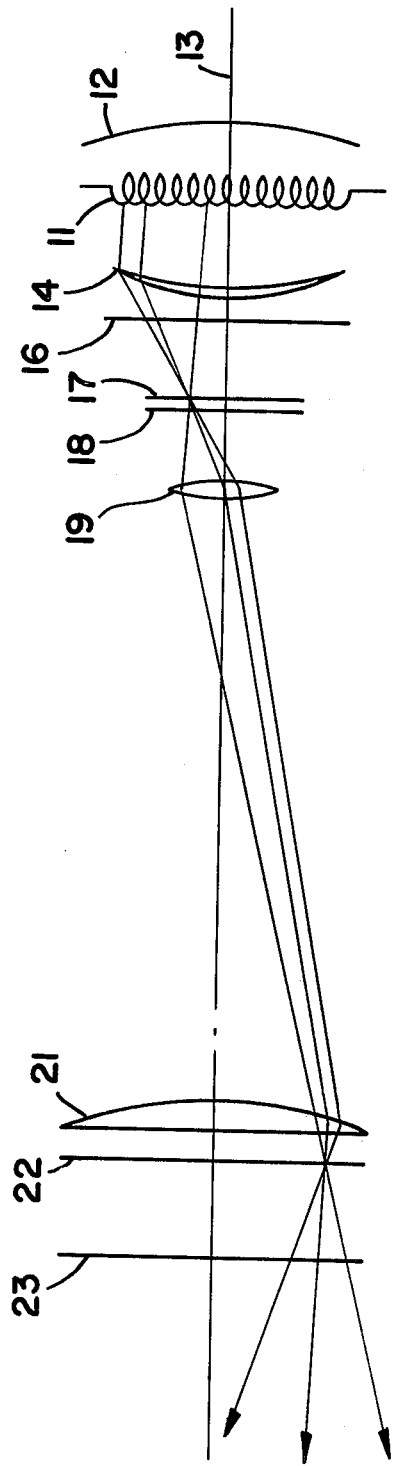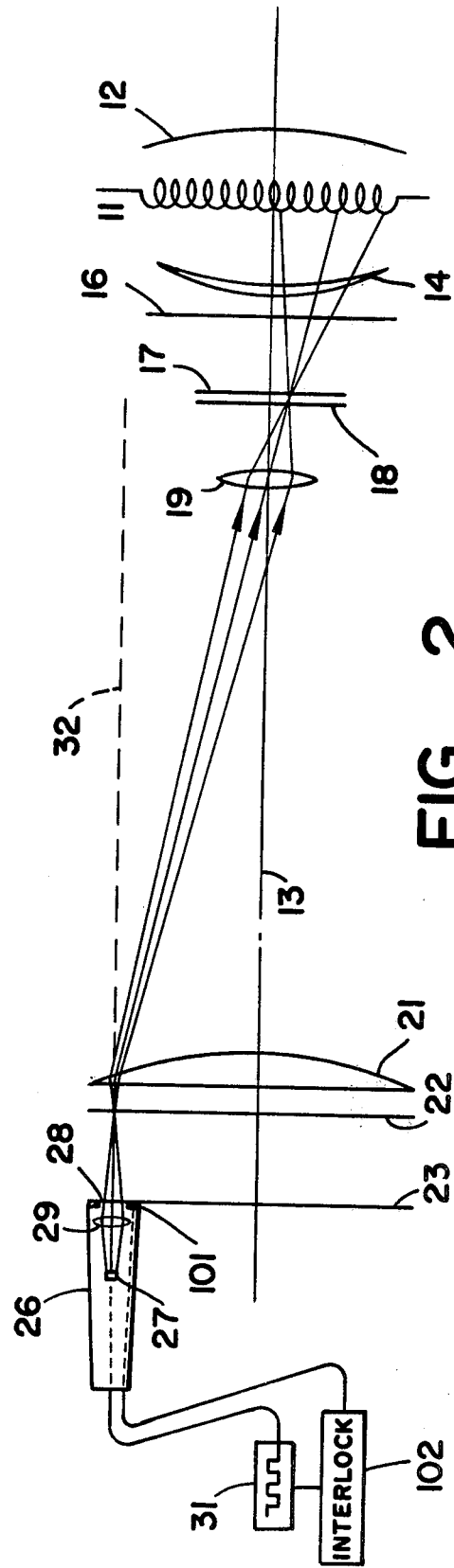

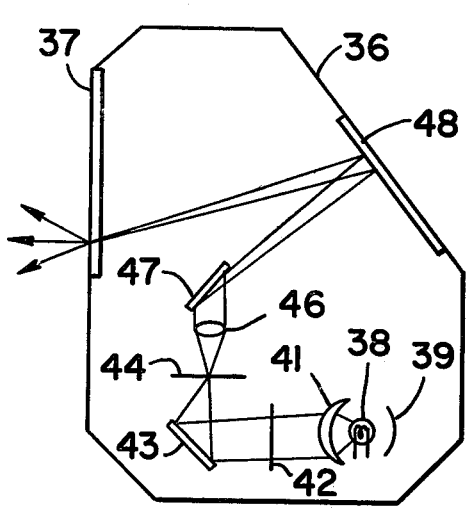
FIG_3
(PRIOR ART)
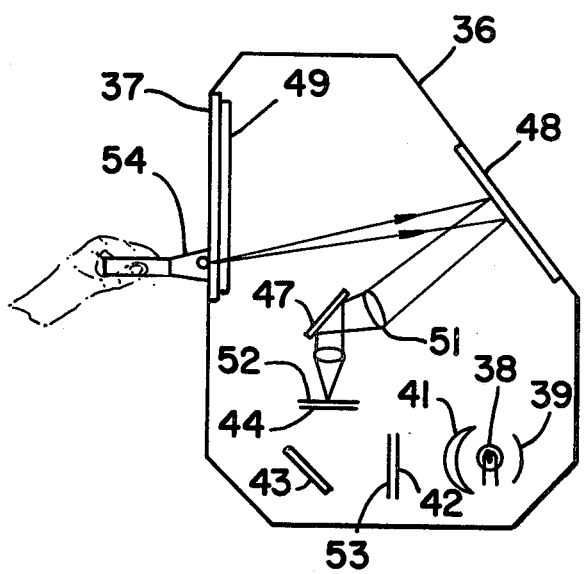
FIG_4
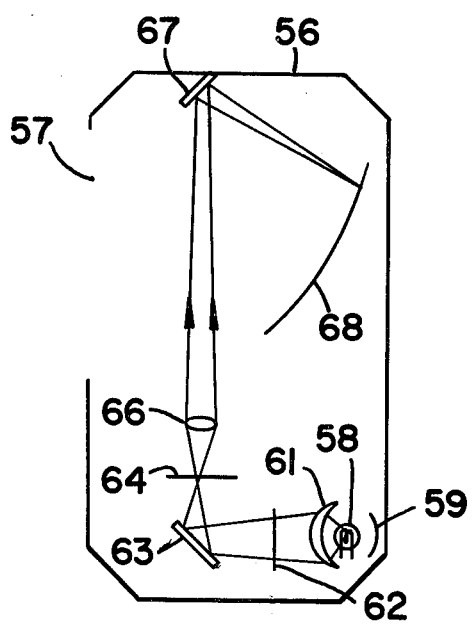
FIG_5
(PRIOR ART)
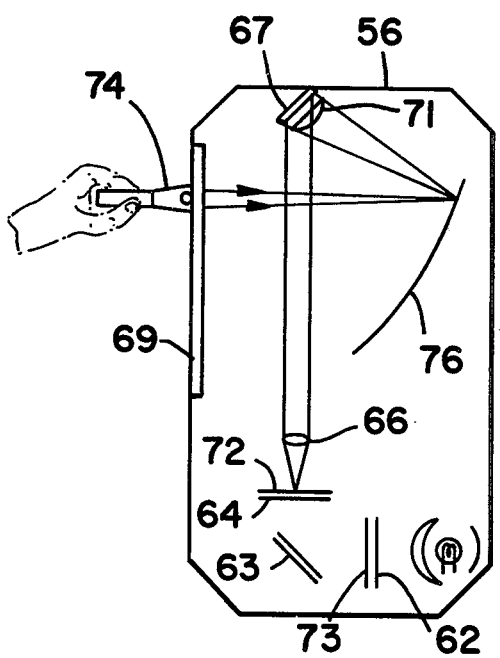
FIG_6

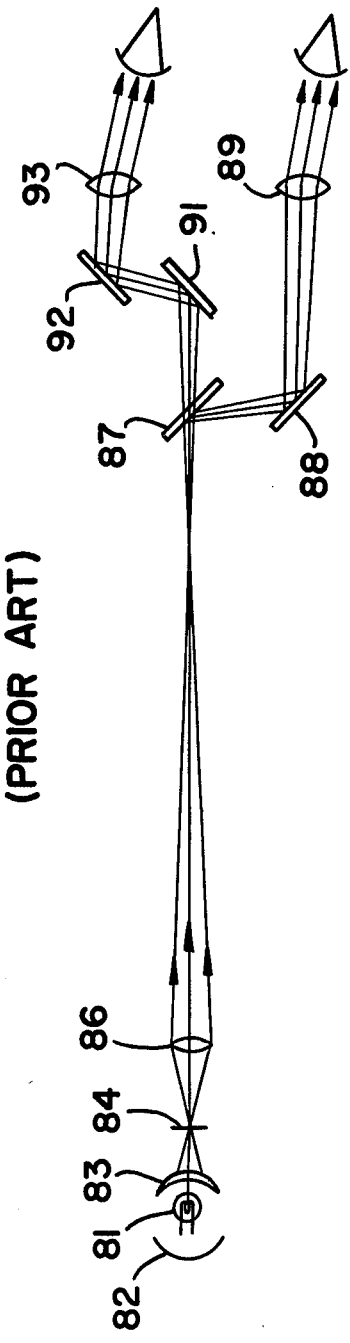
FIG_7 (PRIOR ART)
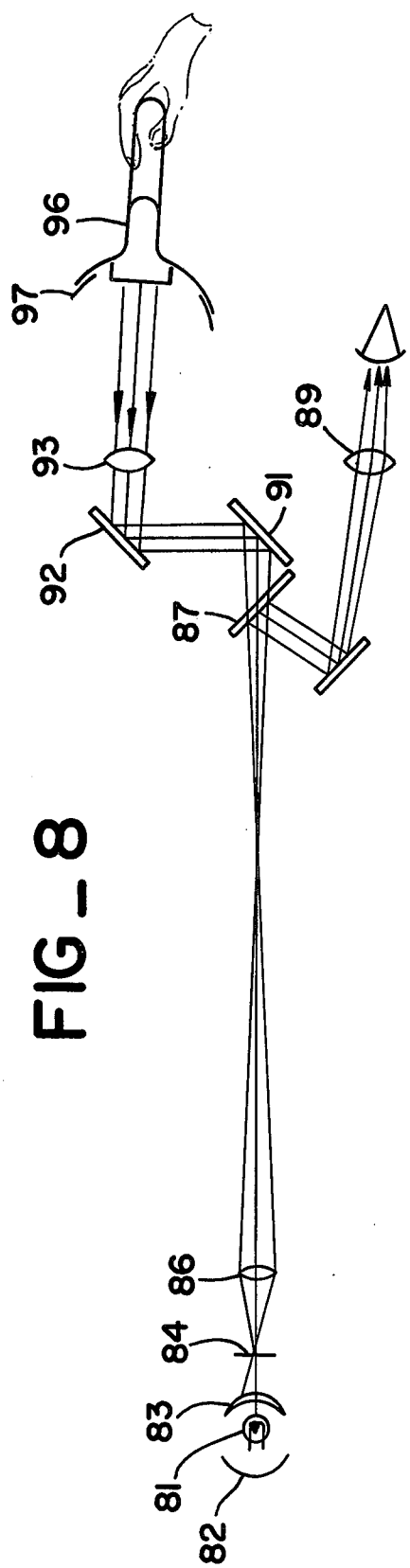
FIG_8

BI-DIRECTIONAL OPTICAL APPARATUS FOR ALTERING AN OPTICALLY PROJECTED MEMBER

BACKGROUND OF THE INVENTION

The present invention generally relates to devices for projecting an image of a projection member, such as a transparency, through an optical system to form an apparent image thereof. More specifically, the present invention includes apparatus for altering or writing on the projection member by means of a writing light which is directed through the optical system in reverse fashion, and is focussed on a recording member disposed adjacent to the projection member.

For example, this invention allows an operator to use microfiche as a notebook which can accept additions and notations. This contrasts with the present situation in which it is difficult to overwrite new information on microfiche. This situation is as if printing had been developed, but the pen or pencil was as yet unknown.

This invention can also be applied to optical inspection and alteration of a workpiece under fabrication or repair.

The following U.S. Pat. Nos. are the most pertinent prior art known to the applicant: 3,892,965, 3,659,933, 3,650,612, 3,492,728, 3,480,965, 3,473,451, 3,915,567.

The prior art discloses several methods for marking or otherwise altering a projection member which is being viewed as an apparent image through an optical system. One such method uses a heated resistor which fuses and erases a portion of a microfilm frame. Other methods use styli which are driven to rub against a film surface and scrape the recorded information thereon from a local area thereof. Other methods employ flash tubes for pyrogenically altering a film transparency, or chemical means for etching a projection surface which creates an image. Other techniques involve super position of new and old informational images, so that the combined images may be rephotographed and stored.

All of these prior art methods suffer from serious disadvantages; they are either extremely expensive, or destructive of the projection member, or extremely cumbersome, or so time consuming that the value of the information added to the projection member is negated by the time required to record it.

SUMMARY OF THE PRESENT INVENTION

The present invention generally comprises an apparatus for recording information on a projection member which is being viewed as an apparent image through an optical transmission system. The apparatus is capable of adding or subtracting information from the projection member virtually instantaneously, and involves only minor modifications of existing optical projection systems.

One significant use for the present invention is in conjunction with microfiche information storage. It is well known that microfiche cards are a convenient and efficient way of storing information in a format which occupies far less volume than information printed on paper. A significant disadvantage of microfiche information storage, especially in contrast to printed paper storage, is that there is no effective means for adding or altering the information on the microfiche transparency. This is true of other optical recording systems, including microfilm, microcard, slides, and films.

The present invention overcomes this deficiency by providing an apparatus which permits an individual to mark or otherwise write on the microfiche image as it is being displayed. The apparatus includes a writing light in the form of a light pen which is directed through the viewing screen of a microfiche card reader, and is aimed at the portion of the image which is to be altered. The microfiche card is provided with a recording transparency disposed directly adjacent thereto, through which the projection beam of the card reader, as well as the writing light from the light pen, passes. The beam from the light pen passes in reverse fashion through the projection optics of the card reader, and is focussed to an intense spot on the recording transparency. The recording transparency is particularly sensitive to the wavelength of the writing light beam, and is altered by the intensely focussed spot to form a local mark. This mark then becomes incorporated in the projected image, so that the mark, or script, or the like, appears to have been written directly on the apparent projected image of the microfiche card. This invention includes several mechanism which assure that the recording transparency is not altered by the projection beam acting alone.

In one embodiment, the microfiche card reader is provided with a filter interposed between the projection light and the recording transparency. The filter removes from the projection beam those wavelengths which will stimulate and alter the recording slide. Thus the recording slide will be sensitive only to the writing beam from the light pen, and not the projection beam alone.

It is important to note that the present invention employs the existing magnifying optical system of a typical microfiche card reader, except that the optical system is used in a reverse fashion to focus the writing light to an intense spot on the recording transparency. Thus the present invention advantageously uses the existing optical system in a typical microfiche card reader, and requires little modification thereof to enable information to be added to the microfiche card frame.

The invention also has broader application, in that any optical projection path may be used reversably to irradiate locally a workpiece while it is being optically inspected. That is, the projection and recording transparencies may be replaced by a workpiece which is altered by the writing light projected reversely through the optics to produce useful work on the workpiece.

A BRIEF DESCRIPTION OF THE DRAWINGS

FIG. 1 is a schematic view of the present invention, shown operating in the projection mode.

FIG. 2 is a schematic view of the present invention, shown operating in the writing mode.

FIG. 3 is a schematic representation of a prior art form of a microfiche card reader.

FIG. 4 is a schematic view of the present invention as applied to the prior art card reader shown in FIG. 3.

FIG. 5 is a schematic representation of another prior art microfiche card reading device.

FIG. 6 is a schematic representation of the present invention used in conjunction with the prior art device shown in FIG. 5.

FIG. 7 is a schematic representation of a binocular microscope known in the prior art.

FIG. 8 is a schematic representation of the present invention used in conjunction with the binocular microscope used in FIG. 7.

DESCRIPTION OF THE PREFERRED EMBODIMENT

The present invention generally comprises an apparatus for projecting an image forming member through an optical system to form an apparent image thereof, and also for directing a writing light beam in reverse fashion through the optical system to alter the image forming member. As shown in FIGS. 1 and 2, one form of the present invention includes a projection light source 11, and a concave reflector 12 disposed adjacent thereto for directing the projection light along an optical axis 13. The projection light passes through a collimating lens 14, and through a projection light filter 16. The projection light filter removes certain wavelengths from the spectrum of wavelengths of light present in the projection light. The purpose of this filter will be explained in greater detail in the following.

Disposed on the optical axis downstream from the filter 16 is a projection transparency 17. This transparency may comprise a photographic slide, a microfilm frame, a microfiche frame, an integrated circuit wafer, or the like. Disposed directly adjacent to the projection transparency 17 is a recording transparency 18. The recording transparency 18 may be integrated with the projection transparency 17, or may comprise a separate member which is maintained in direct adjacent relationship with the projection transparency 17 by mechanical or adhesive means. It is significant that the recording transparency 18 is, in its original state, transparent, and that it responds to that bandwidth which is removed from the projection light by the filter 16. The portion of the recording transparency which is exposed to that bandwidth of light becomes optically marked. The sensitivity of the recording transparency 18 is such that the response time is virtually instantaneous. However, it may be useful to make the mark more permanent with a subsequent fixation process.

Disposed on the optical axis adjacent to the recording transparency 18 is a bi-directional focussing means 19. Although in FIGS. 1 and 2 this bi-directional focussing means is represented as a single convex lens, it may be appreciated that a multiple lens system may be employed for bi-directional focussing. The bi-directional focussing means 19 focusses the projection light passing through the projection transparency 17 onto a viewing screen 22 so that an apparent image is formed thereon. A field element lens 21, comprising any positive lens such as a plano-convex lens or a Fresnel lens is disposed closely spaced to the viewing screen 22. Due to the proximity of the field element lens 21 and viewing screen 22, the field element lens has little or no effect on the focussing of the image from the projection transparency 17 on the viewing surface 22. However, the field element lens guides the writing beam to reduce vignetting during writing. A transparent writing surface 23 faces the viewing surface 22, on the opposite side from the field element lens 21.

The filtered projection light that passes through the filter 16 illuminates the projection transparency 17, and recording transparency 18, and that light passes through the bi-directional focussing means and the field element lens to form an image on the viewing screen 22. It may be appreciated that the viewing screen 22 includes means for scattering the projection light so that the apparent image can be seen by a viewer off the optical axis 13. The image is magnified, so that a viewer may study the information contained in the projection transparency.

A salient feature of the present invention is that it provides apparatus for selectively altering portions of the recording transparency to mark, write on, or otherwise alter the image which is projected onto the viewing screen 22. This alteration may become permanent, in the case of a recording transparency which is permanently joined to the projection transparency, or it may be erasable or removable in the case of a recording transparency which is only mechanically joined to the projection transparency.

The apparatus includes a light pen 26 which is provided with a writing light source 27. The writing light source 27 emits light in a bandwidth which falls within the range of sensitivity of the recording transparency 18. In the preferred embodiment the writing light source comprises a diode injection laser which is driven by a pulsed power supply 31 at a very low duty factor. The writing light passes through an aperture 28 in the light pen 26, and is focussed by a collimating lens 29 to a spot on the viewing surface 22. This is shown in FIG. 2.

The light pen 26 is aligned normal to a transparent writing surface 23, so that its light enters normal to the surface. The writing light passing through the viewing screen 22 is guided by the field element lens 21 into the bi-directional focussing means 19. The bi-directional focussing means in turn focusses the writing light to an intense spot on the recording transparency. It may be appreciated that as the bi-directional focussing means acts to magnify the projected image which appears on the viewing screen 22, in the same regard it acts to focus the writing light to a tiny, very intense spot. The writing writing light to a tiny, very intense spot. The writing light is absorbed within the recording transparency 18.

The intense spot of writing light focussed on the recording transparency 18 causes the illuminated area to react virtually instantaneously and produce a visible mark. As the projection, shown schematically in FIG. 1, takes place simultaneously with the writing procedure as shown in FIG. 2, the observer will note that the writing light has formed a mark on the projected image. The light pen 26 may be directed at different portions of the projected image, and thus through the optical system to the portion of the projection transparency which forms that portion of the image, so that information may be selectively added or deleted from the projection transparency. The light pen 26 may be manipulated by mechanical means, or manually to permit script writing and notations to be added to the projection transparency.

It should be noted that the present invention relies on the reciprocity theorem of Helmholtz. From this theorem it follows that an apparent writing light source at the apparent viewing surface will be focussed to a writing image at the corresponding point on the projection transparency. This is true, however, only if the writing beam retraces the optical path to the bi-directional focussing means 19. As shown in FIG. 2, the writing beam could be directed along any of a number of lines represented as broken line 32, and completely miss the bi-directional focussing optics. This would cause reduced transmission when the writing light is off the optical axis and is called vignetting. The field element lens represents one means of increasing the acceptance of the bi-directional focussing means so that the writing beam will always pass through the bi-directional focussing means to the recording transparency. The focal length of the field element 21 is substantially equal to the effective optical distance from the viewing screen to the bi-directional focussing means 19. Any writing beam passing perpendicularly through the viewing screen 22 will be refracted by the field element so that it is directed to the bi-directional focussing means 19 and thus to the recording transparency. It should be noted that due to the minimal or nonexistant spacing between the viewing screen and the field element, the field element has no perceivable effect on the projection image that is formed on the viewing screen. Another technique to avoid vignetting is to use a curved writing screen 23, so that at each point on the screen the normal ray is directed into the bi-directional focussing means 19.

The present invention is particularly applicable to microfiche information storage systems. As shown in FIG. 3, a typical prior art microfiche card reader includes a housing 36 having a viewing screen 37. The card reader includes a projection lamp 38 and a concave reflector 39 which directs the projection light through a collimator lens 41 to a filter 42. The filter 42 removes a substantial portion of the infrared contents of the projection light, to avoid burning the microfiche card.

The projection light passes through the filter 42 to a mirror 43, which directs the projection light to the microfiche card 44. The projection light passing through the microfiche card passes through a projection lens 46 and is reflected from a mirror 47 to a mirror 48 which is in opposing relationship to the viewing screen 37. The mirror 48 directs the projected light to the viewing screen. The lens 46 focuses each point in the microfiche card 44 to a corresponding point on the viewing screen 37. Typically, the viewing screen is formed of ground glass or similar translucent material which will form an image thereon. This device is generally known as a rear projection microfiche viewer.

The microfiche card viewer as shown in FIG. 3 may be modified to incorporate the present invention and thus facilitate direct writing onto the microfiche card. As shown in FIG. 4, a field element lens 49 is secured to the rear surface of the viewing screen 37. The lens 49 may comprise a Fresnel lens which functions in the same manner as the lens 21 of FIGS. 1 and 2. A second field element lens 51 is provided in the optical path between the mirror 47 and the mirror 48, also to increase the angular acceptance of the optical system. Disposed directly adjacent to the microfiche card 44 is a recording transparency 52. The recording transparency may be applied directly to the microfiche card by mechanical or chemical means, or it may comprise a separate recording cell within the housing 36 which does not permanently alter the information on the microfiche card. Also, a second filter 53 is interposed in the projection beam path adjacent to the filter 42 and between the collimator lens 41 and the mirror 43. The filter 53 removes from the projection light those wavelengths to which the recording transparency 52 is sensitive.

The writing light beam is provided by the light pen 54, which is wielded manually and directed toward a selected portion of the image which is projected onto the translucent screen 37. The writing beam passes through the screen 37 and the field element lens 49, and is directed thereby to the mirror 48. The writing beam is reflected from the mirror 48 to the field element 51, which guides the writing beam onto the mirror 47. The writing beam is reflected from the mirror 47 to the projection lens 46, which focusses the writing beam to an intense spot on the portion of the microfiche transparency which forms the image portion at which the light pen 54 is directed. As explained in the foregoing, the recording transparency 52 is highly sensitive to the wavelength of light produced by the light pen 54, and the intensely focussed writing beam causes the recording transparency to form a local opaque portion wherever the writing beam spot is aimed. Thus an individual is free to alter any portion of the microfiche frame which is being projected onto the screen 37.

It should be noted that only minor modifications to the existing microfiche card viewer of FIG. 3 are required to incorporate the present invention. These modifications include the field element lens 49, the field element lens 51, the recording transparency 52, which may be a part of the microfiche card, the added projection light filter 53, and possibly a different screen 37. These added elements may easily be incorporated in an existing microfiche card viewer with little cost or labor.

A translucent viewing screen 37, as known in the prior art, scatters the projection beam which falls thereon to allow off-axis viewing of the projected image. Likewise, the viewing screen 37 will also scatter the writing beam which is directed therethrough toward a selected part of the projected image. This scattering of the writing beam is objectionable, in that it reduces the intensity of the writing spot on the recording transparency 52. Should this scattering effect prove to be detrimental, the light pen 54 may be provided with a more intense light source so that the writing beam emerging from the viewing screen 37 is of sufficient intensity to form an acceptable mark on the recording transparency 52.

Alternatively, the viewing screen 37 may be replaced with a solid optical filter which is selectively permeable within a narrow bandwidth of optical wavelengths, and which scatters other wavelengths. One such solid optical filter, based on the Christiansen effect, is disclosed in U.S. Pat. No. 3,887,485, issued on June 3, 1975. This patent discloses various methods for forming solid optical filters having selected ranges of permeability. In the present invention, it is necessary to match the permeability bandwidth to the bandwidth of the writing beam. In this way the writing beam will pass through the viewing screen without scattering, while the projection beam will be substantially scattered.

Another form of prior art projection device is the front projection microfiche card viewer shown in FIG. 5. This device includes a housing 56 having an open viewing port 57 in one side thereof. The projection system of this device includes a projection lamp 58, and a concave mirror 59 for directing the projection light through a collimating lens 61. The projection light then passes through an infrared filter 62, and is reflected from a mirror 63 to the microfiche card 64. The projection light passing through the microfiche card 64 is transmitted through a projection lens 66 to a mirror 67. The mirror 67 directs the projection beam to a diffusely reflective curved viewing screen 68. The lens 66 focuses each point of the microfiche 64 to a corresponding point on the screen 68. The screen 68 is situated in opposed relationship to the viewing port 57, so that an individual may gaze through the port 57 to see the image formed on the screen 68.

As shown in FIG. 6, the front projection microfiche viewer may be easily modified to incorporate the direct writing feature of the present invention. A transparent writing screen is disposed in the viewing port 57, to provide a convenient surface against which the light pen 74 may be rested and translated. The curved viewing screen 68 is replaced by a selectively scattering curved reflective screen 76. The screen 76 is selective in that it scatters the projection beam from the lamp 58, yet it reflects without scattering the bandwidth of light within which the light pen 74 emits its writing beam. The curvature of the screen 76 also acts as a field element to guide the writing beam into the bi-directional focussing means 66 and thus to avoid vignetting.

The front projection embodiment of the present invention also includes a field element 71 which comprises a positive lens interposed between the mirror 67 and the screen 76. The field element 71 also increases the acceptance for the writing beam. The modifications also include the recording transparency which is disposed adjacent to the microfiche card 64, and the projection light filter 73 disposed adjacent to the existing filter 62 for removing the writing light bandwidth from the projection beam.

In the embodiment of FIG. 6, the writing light beam from the light pen 74 passes through the transparent screen 69, and strikes the curved screen 76 at a selected portion of the image which is formed thereon. The writing beam is reflected to the lens 71 and thence to the mirror 67. The beam is reflected from the mirror 67 through the projection lens 66 to the recording transparency 72. The recording transparency is thus marked as described in the foregoing. It may be appreciated that the selectively scattering mirrors 76 may be formed of the same material as the selectively scattering viewing screen described with regard to the embodiment of FIG. 4. In the embodiment of FIG. 6, however, the solid optical filter is silvered or otherwise formed as a mirror to selectively scatter the projection beam while reflecting the writing beam without scattering. In this embodiment, it should also be emphasized that the prior art rear projection viewer may easily be modified to incorporate the present invention.

In any of the embodiments described in the foregoing, an advantageous embodiment for the light source of the light pen is a diode laser which is driven by a pulsed power source at a low duty factor. The laser is selected because of its intense brightness. A diode laser may have a peak pulse power of ten to twenty watts, while the low duty factor determines that the average power emitted by the laser is quite low. The high peak power causes the recording transparency to be altered within the span of a few pulses, or even a single pulse, while the low average power prevents accidental damage to the eye of an observer.

Accidental damage to a human eye may also be avoided by other safety features. The light pen may be provided with a mechanical tether which permits it to be directed only toward the writing surface. Furthermore, the light pen may be provided with a mechanical or electrical interlock which permits the laser light source to be operated only when the light pen is in contact with the writing surface. The prior art is replete with these safety devices.

One particular interlock 102 is both novel and particularily useful. The light pen 74 contains a light sensitive element 101 which detects the projection light. Only when this is detected is the interlock actuated to enable the power supply 31. Thus if the light pen is aimed away from the screen, the writing light is blocked. Another safety technique is to locate the light source just inside the viewing screen. The light source is mounted on a movable linkage coupled to a pen outside the viewing screen.

It should be noted that all of the embodiments described in the foregoing require that the light pen be directed perpendicularly to the writing surface, so that the writing beam will strike the portion of the projection transparency which corresponds to the portion of the image which is to be altered and thus to avoid vignetting. The light pen may be provided with an alignment means which contacts the writing surface and maintains a flush, perpendicular relationship thereto.

In any of the alternative embodiments of the present invention, it may be advantageous to employ a reusable recording means which may be permanently installed in the embodiments of FIGS. 1, 2, 4, and 6. One such reusable recording means may comprise a locally erasable thermo-optic smectic liquid crystal storage display, as is known in the prior art.

Alternatively, the recording transparency may be unified with the projection transparency. For example, the writing spot may directly bleach or burn the projection transparency to add or delete information thereon. Or, the projection transparency may be coated directly with an additional layer of heat sensitive or light sensitive material. This unified projection-recording transparency may be handled, stored, viewed, and reviewed as a single standard microfiche card, projection slide, or the like. In this embodiment, the recorded information is permanently incorporated with the projection image.

The recording trnsparency may comprise a transparent material incorporating a dye or pigment which absorbs only certain wavelengths. The bandwidth sensitivity of the absorber matches the output bandwidth of the writing pen, so that the localized heating caused by the absorber receiving the writing spot causes a thermographic or thermochromic change in the recording transparency. Furthermore, the same absorber may be incorporated in the added projection light filter which removes the writing light bandwidth from the projection beam. This same absorber filtering system guarantees that the recording transparency sensitivity will match the filter pass band so that no clouding or stray marking of the recording transparency may occur.

It may be appreciated that even though the projection light is filtered to remove the writing light bandwidth, the projection light will still preheat the recording film to a temperature somewhat above room temperature. The thermochromic recording agent incorporated in the recording transparency may be provided with a transition temperature (at which it changes from transparent) which is just above the preheat temperature caused by the projection light passing therethrough. Therefore, only a small temperature increase is required to mark the recording transparency. The synergistic heating effect of the projection beam and writing beam falling on the same local area of the recording transparency is sufficient to surpass the transition temperature, and to mark the local area of the transparency.

This synergistic design permits a higher transition temperature thermochromic recorder than a design which uses the writing light solely to boost the temperature of the recording transparency from room temperature to transition temperature. Because of this higher transition temperature it is less likely that the projection beam alone can mark the writing film. The recording transparency, having a higher transition temperature is more stable, and is capable of longer storage without degradation.

The present invention also has important applications in the field of microscopy. From the discussion of the previous embodiments, it may be appreciated that the underlying principle of the present invention is that the optical system in an optical viewing device may be used reversably, projecting a writing light beam back along the optical path to the object being viewed, so that useful work may be done on the object. This principle also has direct applications to microscopy as well as to microfiche card viewers.

As shown in FIG. 7, a representative binocular microscope known in the prior art includes an illumination lamp 81, and a concave mirror 82 which drects the illuminating light to a collimating lens 83. The lens 83 focuses the light into a beam which passes through the microscope slide 84, illuminating the subject or workpiece to be viewed. The light passing through the slide is collected by an objective lens 86, and it passes thence to a beam splitter 87. Half of the light is reflected to a mirror or prism 88, and thence through an eye piece lens 89 to one of the viewers eyes. Half of the light from the lens 86 passes directly through the beam splitter 87, and is reflected from two mirrors or prism surfaces 91 and 92 to a second eyepiece lens 93 and thence to the other eye of the viewer. As is well known in the prior art, this form of binocular microscope provides high magnification of the subject on the slide 84. The subject being viewed may comprise a biological specimen, an integrated circuit device, a material sample, the damaged retina of an eye, or the like.

Useful work may be performed on the subject being viewed by directing an intense focussed spot of light onto the subject. For example, the heating effect associated with the intensely focused spot may alter a biological specimen or a material sample, or may secure a torn retina, or the like. In the case of an integrated circuit structure, the structure may be coated with a photoresist material which is sensitive to the wavelength of the spot of light, and locally exposed by the spot to permit selective etching or doping of the structure. Useful alteration may also occur via ablation or melting.

As shown in FIG. 8, the present invention includes a writing assembly 96 which houses a writing light source. The writing assembly is secured to one eyepiece of the binocular microscope by means of a hemispheric bearing 97, which supports the writing assembly and permits it to be directed at any part of the apparent image of the slide 84. The writing assembly includes a pilot beam which is directed in reverse fashion back along the optical path; i.e., through the eyepiece lens 93 and the reflecting surfaces 92 and 91, through the beam splitter and the objective lens 86, to the slide 84. From here part of the pilot beam is reflected to the observer's eyepiece 89. The pilot beam indicates the point on the slide at which the writing beam is directed, yet the pilot beam does not have the intensity or wavelength to perform any work on the viewed object itself. The other eyepiece 89 is used by the viewer to observe the positioning of the pilot beam.

When the pilot beam is correctly positioned, the writing assembly is activated to produce an intense writing light beam which is directed along the same axis as the pilot beam to the point on the viewed object at which the pilot beam is directed. In this embodiment the writing light source may also comprise a diode laser, since the bright output of the laser is capable of a most intense focus.

It should be noted that the pilot beam feature of the embodiment depicted in FIG. 8 may also be incorporated in the other embodiment of the present invention described in the foregoing. Thus the observer may be apprised of the exact portion of the projection transparency which will be altered prior to the actuation of the writing light itself. Thus unwanted alterations of the workpiece and other accidental occurrances will be minimized.

Several other embodiments may be readily seen. The optical system can use either focussing lenses or focussing mirror or both. The projection and recording members can be illuminated either by transmission or by reflection or both. In each case the preceeding principles have a corresponding realization.

The light pen also can assume various embodiments to allow different recording modes. The aforementioned light pen is appropriate for manual writing. Alternatively the light pen can be mechanically guided for automatic or remote recording. An advantageous technique is to use optical deflection of a light beam to minimize mechanical complexity.

In manuscript recording, the light pen should illuminate a single writing spot. In other applications, the light pen should illuminate a whole character. One convenient means is an array of selectively activated light sources (analogous to prior art LED character display readouts). Thus the pen would effectively form an entire character in one exposure.

For facsimile recording, the light source should scan the writing surface, with a modulated intensity which corresponds to the desired image. This can be done with a single light source which raster scans the whole writing surface. Another facsimile mechanism is a line of many parallel light sources which are individually modulated. Thus the whole screen area can be scanned by simply sweeping this line source across the area.

Another mode of operation is document recording. The original document is placed adjacent to the projection screen, and the document is intensely illuminated. The variegated transmission or reflection will produce a corresponding pattern of writing light. If the document is illuminated by reflection, it will be necessary to reverse the image by adding or removing image reversing prisms or mirrors in the optical system. Another technique for document recording is to illuminate the document away from the projection screen, and to focus the light from the document to the projection screen.

All of these embodiments are realizations of this overall invention of a light source used with a bidirectional image projection and recording system.

I claim:

1. In a device for illuminating a subject and projecting an image of said subject through an optical focusing systems to an apparent image, an apparatus for performing useful work on said subject, comprising light source means directed at said apparent image for emitting a beam of writing light, means for directing said writing light from the image plane back through said optical focusing means to focus on said subject, and recording means closely adjacent to said subject for undergoing perceptible change in response to said writing light.

2. The apparatus of claim 1, wherein said light source means emits a narrow beam of writing light within a narrow bandwidth, and said recording means is selectively responsive to said narrow bandwidth.

3. The apparatus of claim 1, wherein said light source means comprises a pulsed light source having a large peak power output and a low average power output.

4. The apparatus of claim 1, further including means for rendering said recording means selectively responsive to said writing light and unresponsive to the illumination light.

5. The apparatus of claim 4, wherein said recording means includes a minimum temperature at which said perceptible change occurs, said projection light means heating and recording means to a temperature just below said minimum temperature; and wherein said writing light provides sufficient energy within its focus on said recording means to raise said recording means above said minimum temperature.

6. The apparatus of claim 4, wherein said light source means emits said narrow beam of light within a narrow bandwidth, and said recording means is responsive only to said narrow bandwidth of light.

7. The apparatus of claim 6, further including projection light filter means for filtering from said projection light means output said bandwidth of said writing light.

8. The apparatus of claim 1, further including means for increasing the angular acceptance of said optical focussing means for said beam of writing light.

9. The apparatus of claim 8, wherein said means for increasing said angular acceptance includes at least one field focussing lens or mirror interposed between said image plane and said optical focussing means.

10. The apparatus of claim 8, wherein said means for increasing said angular acceptance includes a curved writing screen having a center of curvature at said optical focussing means.

11. The device of claim 10, wherein said light pen means includes means for directing a narrow beam of light perpendicularly through said viewing screen.

12. The device of claim 10, further including pilot beam means associated with said light pen means for indicating the focus of said narrow beam of light on said microfiche card frame prior to actuation of said light pen means.

13. The device of claim 10, further including means associated with said viewing screen for selectively transmitting said writing light and scattering said projected image of said microfiche card frame.

14. The device of claim 10, wherein said optical means includes at least one field element interposed between said viewing screen and said optical focussing system.

15. The device of claim 10, wherein said recording means includes a recording transparency sensitive to a narrow bandwidth of light.

16. The device of claim 15, wherein said writing light is within said narrow bandwidth.

17. The device of claim 15, further including filter means for removing said narrow bandwidth from the output of the illuminating means of said apparatus.

18. The apparatus of claim 1, wherein said recording means includes a recording transparency disposed adjacent to said subject.

19. The apparatus of claim 1, further including viewing screen means for selectively scattering said projected image of said object and transmitting said writing light in unscattered fashion.

20. In an apparatus for illuminating a microfiche card frame and projecting the image thereof through an optical focussing system to a viewing screen, a device for selectively marking said microfiche card frame, comprising light pen means for emitting a beam of writing light through said viewing screen, optical means for directing said writing beam through said optical focussing system to said microfiche card frame, and recording means disposed directly adjacent to said microfiche card frame for undergoing perceptible optical change in response to said writing beam.

* * * * *